(12) United States Patent
Hansen et al.

(10) Patent No.: US 11,216,639 B2
(45) Date of Patent: Jan. 4, 2022

(54) TEMPLATE MATCHING OF A BIOMETRIC OBJECT

(71) Applicant: FINGERPRINT CARDS AB, Gothenburg (SE)

(72) Inventors: Morten Hansen, Hellerup (DK); Klaus S. Andersen, Hvidovre (DK); Morten Jensen, Farum (DK); Morten With Pedersen, Frederiksberg (DK)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 0 days.

(21) Appl. No.: 16/619,185

(22) PCT Filed: May 31, 2018

(86) PCT No.: PCT/SE2018/050551
§ 371 (c)(1),
(2) Date: Dec. 4, 2019

(87) PCT Pub. No.: WO2018/231122
PCT Pub. Date: Dec. 20, 2018

(65) Prior Publication Data
US 2020/0151419 A1    May 14, 2020

(30) Foreign Application Priority Data
Jun. 15, 2017 (SE) .................... 1750762-5

(51) Int. Cl.
*G06K 9/00* (2006.01)
*G06K 9/03* (2006.01)

(52) U.S. Cl.
CPC ..... *G06K 9/00087* (2013.01); *G06K 9/00033* (2013.01); *G06K 9/00067* (2013.01); *G06K 9/00926* (2013.01); *G06K 9/036* (2013.01)

(58) Field of Classification Search
CPC ........... G06K 9/00033; G06K 9/00067; G06K 9/00087; G06K 9/00926; G06K 9/036;
(Continued)

(56) References Cited

U.S. PATENT DOCUMENTS

| 6,070,159 A | 5/2000 | Wilson et al. |
| 2003/0091724 A1* | 5/2003 | Mizoguchi ......... G06K 9/00087 427/1 |

(Continued)

FOREIGN PATENT DOCUMENTS

| EP | 3252661 A1 | 12/2017 |
| GB | 2511467 A | 9/2014 |

(Continued)

OTHER PUBLICATIONS

PCT International Search Report and Written Opinion dated Sep. 28, 2018 for International Application No. PCT/SE2018/050551, 12 pages.

(Continued)

Primary Examiner — Michael J Vanchy, Jr.
(74) Attorney, Agent, or Firm — RMCK Law Group, PLC (57) ABSTRACT

The method comprises capturing a plurality of images of a single biometric object during a single activation of a biometric sensor and ranking the images based on a ranking metric value of each of the images to determine a highest ranked image and at least one non-highest ranked image. The method comprises comparing, in a first matching attempt for the biometric object, the highest ranked image to templates of a plurality of pre-stored biometric object templates, wherein a matching metric is determined for each compared template, and generating a match indicating signal when it is determined that at least one of the matching metrics exceeds a matching threshold value. When it is (Continued)

determined that none of the matching metrics exceed the matching threshold value, one of the non-highest ranked images is compared, in a further matching attempt, to templates of the plurality of templates based on the matching metrics.

15 Claims, 4 Drawing Sheets

(58) Field of Classification Search
CPC ........... G06K 9/00006; G06K 9/00013; G06K 9/6268; G06K 9/6293; G06T 7/0002
See application file for complete search history.

(56) References Cited

U.S. PATENT DOCUMENTS

| | | | |
|---|---|---|---|
| 2005/0226467 A1 | 10/2005 | Hatano et al. | |
| 2008/0240515 A1* | 10/2008 | Uno | G06K 9/00926 |
| | | | 382/115 |
| 2009/0219154 A1 | 9/2009 | Kukula et al. | |
| 2015/0169934 A1* | 6/2015 | Tsai | G06K 9/00033 |
| | | | 382/115 |
| 2017/0091522 A1 | 3/2017 | Setlak et al. | |
| 2019/0087637 A1* | 3/2019 | Zhang | G06K 9/00926 |

FOREIGN PATENT DOCUMENTS

| | | |
|---|---|---|
| WO | 2006055767 A2 | 5/2006 |
| WO | 2017080291 A1 | 5/2017 |

OTHER PUBLICATIONS

Extended European Search Report dated Jan. 27, 2021 for EP Application No. 18816833.0, 7 pages.

Uludag, U. et al., "Biometric template selection and update: a case study in fingerprints," Pattern Recognition, vol. 37, No. 7, Jul. 1, 2004, pp. 1533-1542.

* cited by examiner

TEMPLATE MATCHING OF A BIOMETRIC OBJECT

CROSS-REFERENCE TO RELATED APPLICATIONS

This application is a 371 U.S. National Stage of International Application No. PCT/SE2018/050551, filed May 31, 2018, which claims priority to Swedish Patent Application No. 1750762-5, filed Jun. 15, 2017. The disclosures of each of the above applications are incorporated herein by reference in their entirety.

TECHNICAL FIELD

The present disclosure relates generally to the field of biometric recognition. More particularly, it relates to matching of biometric objects to pre-stored templates.

BACKGROUND

Many fingerprint capture processes have aimed at ensuring capture of one high quality image and performing fingerprint matching (also commonly referred to as fingerprint identification, fingerprint recognition, etc.) based on that one image.

Other strategies may apply capturing of multiple images during a time period that extends from a finger being detected by a sensor and to either the finger being lifted from the sensor or a maximum number of captured images being reached.

Various algorithms available to the skilled person may be applied as suitable before each capture in either of these approaches to provide captures that fulfil some requirement (e.g. regarding image quality).

When multiple images are captured during a single recognition attempt, one approach to fingerprint recognition is to perform one fingerprint matching for each of the multiple images in sequence and grant access (or similar action associated with a recognized fingerprint) when at least one of the images passes a criterion of the matching.

However, such an approach is computationally extensive (and thereby requires more time and/or power than preferable).

Therefore, there is a need for an approach to fingerprint matching when multiple images are available from a single activation of a sensor.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

It is an object of some embodiments to solve or mitigate, alleviate, or eliminate at least some of the above or other disadvantages.

According to a first aspect, this is achieved by a biometric object matching method comprising capturing (by an image capturing device) a plurality of images of a single biometric object during a single activation of a biometric sensor associated with the image capturing device and ranking the plurality of images based on a ranking metric value of each of the plurality of images to determine a highest ranked image and at least one non-highest ranked image.

The method also comprises comparing (in a first matching attempt for the biometric object) the highest ranked image to templates of a plurality of pre-stored biometric object templates, wherein a matching metric is determined for each compared template, and determining whether at least one of the matching metrics exceeds a matching threshold value.

If at least one of the matching metrics exceeds the matching threshold value, the method comprises generating a match indicating signal.

When none of the matching metrics exceed the matching threshold value, the method comprises comparing (in a further matching attempt for the biometric object) one of the non-highest ranked images to templates of the plurality of templates based on the matching metrics, wherein a further matching metric is determined for each compared template.

When reference is made herein to pre-stored biometric object templates, such terminology is meant to encompass the situation where the biometric object templates have been enrolled by a user. Thus, the term enrolled biometric object templates should be seen as equally applicable where the term pre-stored biometric object templates is used herein.

In some embodiments, the method may further comprise determining whether at least one of the further matching metrics exceeds the matching threshold value, generating the match indicating signal when at least one of the further matching metrics exceeds the matching threshold value and, when none of the further matching metrics exceed the matching threshold value, comparing (in a yet further matching attempt for the biometric object) another one of the non-highest ranked images to templates of the plurality of templates based on the matching metrics, wherein a yet further matching metric is determined for each compared template. The comparison of the yet further matching attempt may be further based on the further matching metrics of the further attempt according to some embodiments.

The further matching attempt may, according to some embodiments, comprise determining a further matching attempt sub-set of the templates based on the matching metrics and comparing the non-highest ranked image to templates of the further matching attempt sub-set only.

The further matching attempt may, according to some embodiments, comprise determining an order of the templates based on the matching metrics and comparing the non-highest ranked image to the templates in the determined order.

The first matching attempt may, according to some embodiments, comprise determining a first matching attempt sub-set of the templates and comparing the highest ranked image to templates of the first matching attempt sub-set only.

The method may further comprise dynamically adapting the matching threshold value for the further matching attempt based on the matching metric according to some embodiments.

In some embodiments, the method may further comprise comparing (in an updating attempt for a template of the plurality of pre-stored biometric object templates) a first number—greater than one—of the plurality of images to the template, wherein a matching metric is determined for each of the compared images, and determining whether at least a second number—greater than one and less than, or equal to, the first number—of the matching metrics exceed an updating threshold value. The method may then comprise updating the template based on the plurality of images when at least the second number of the matching metrics exceed the updating threshold value and preventing update of the template when less than the second number of the matching metrics exceed the updating threshold value.

A second aspect is a computer program product comprising a computer readable medium, having thereon a computer program comprising program instructions. The computer program is loadable into a data processing unit and configured to cause execution of the method according to the first aspect when the computer program is run by the data processing unit.

A third aspect is a biometric object matching arrangement comprising a controller configured to cause capturing (by an image capturing device) of a plurality of images of a single biometric object during a single activation of a biometric sensor associated with the image capturing device and ranking of the plurality of images based on a ranking metric value of each of the plurality of images to determine a highest ranked image and at least one non-highest ranked image.

The controller is also configured to cause comparison (in a first matching attempt for the biometric object) of the highest ranked image to templates of a plurality of pre-stored biometric object templates, including determination of a matching metric for each compared template and determination of whether at least one of the matching metrics exceeds a matching threshold value.

The controller is configured to cause generation of a match indicating signal when at least one of the matching metrics exceeds the matching threshold value and, when none of the matching metrics exceed the matching threshold value, comparison (in a further matching attempt for the biometric object) of one or more of the non-highest ranked images to templates of the plurality of templates based on the matching metrics, including determination of a further matching metric for each compared template.

In a fourth aspect, a biometric object matching arrangement is provided comprising an image capturing device, a ranking module (e.g. ranking circuitry), a comparing module (e.g. comparing circuitry), a match determination module (e.g. determination circuitry), and a signal generation module (e.g. signal generation circuitry).

The image capturing device is configured to capture a plurality of images of a single biometric object during a single activation of a biometric sensor associated with the image capturing device.

The ranking module is configured to rank the plurality of images based on a ranking metric value of each of the plurality of images to determine a highest ranked image and at least one non-highest ranked image.

The comparing module is configured to compare (in a first matching attempt for the biometric object) the highest ranked image to templates of a plurality of pre-stored biometric object templates. The comparing module may be associated with a metric determination module configured to determine a matching metric for each compared template.

The match determination module is configured to determine whether at least one of the matching metrics exceeds a matching threshold value.

The signal generation module is configured to generate a match indicating signal when at least one of the matching metrics exceeds the matching threshold value. The signal generation module may also be configured to generate a no-match indicating signal when it is considered that no match is found as will be exemplified later herein.

The comparing module is also configured to, when none of the matching metrics exceed the matching threshold value, compare (in a further matching attempt for the biometric object) one or more of the non-highest ranked images to templates of the plurality of templates based on the matching metrics, and the metric determination module is configured to determine a further matching metric for each compared template.

A fifth aspect is a server node comprising the biometric object matching arrangement of the third aspect or the fourth aspect.

A sixth aspect is a system for biometric object matching. The system comprises at least one of the biometric object matching arrangement of the third aspect or the fourth aspect and the server node of the fifth aspect. The system also comprises a memory configured to pre-store a plurality of biometric object templates and a biometric sensor associated with an image capturing device, the image capturing device being configured to capture a plurality of images of a single biometric object during a single activation of the biometric sensor.

The system also comprises circuitry (e.g. comprised in, or otherwise associated with, the arrangement or server node) configured to:
  rank the plurality of images based on a ranking metric value of each of the plurality of images to determine a highest ranked image and at least one non-highest ranked image;
  compare, in a first matching attempt for the biometric object, the highest ranked image to templates of the plurality of templates, including determination of a matching metric for each compared template;
  determine whether at least one of the matching metrics exceeds a matching threshold value;
  generate a match indicating signal when at least one of the matching metrics exceeds the matching threshold value; and
  when none of the matching metrics exceed the matching threshold value, compare, in a further matching attempt for the biometric object, one of the non-highest ranked images to templates of the plurality of templates based on the matching metrics, wherein a further matching metric is determined for each compared template.

An interface for receiving the match indicating signal is also comprised in the system.

In some embodiments, any of the above aspects may additionally have features identical with or corresponding to any of the various features as explained above for any of the other aspects.

An advantage of some embodiments is that an approach is provided to fingerprint matching when multiple images are available from a single activation of a sensor, the approach being computationally less extensive (and thereby requiring less time and/or power) than other approaches applicable in such situations.

Another advantage of some embodiments is that the use of results (matching metrics) from previous attempts may (in relation to other approaches) result in one or more of lower computational effort, reduced latency, lower power consumption, improved overall performance, reduced error rate. Thus, different information aspects about the biometric object that is present in the different image captures may be combined for improved performance.

Some embodiments aim at improving overall system performance and/or lowering the matching error by utilizing the plurality of images in the matching process. In some embodiments, this is achieved while reducing computational overhead compared to other approaches using multiple images. Such advantages may be provided by using—in processing of an image—information that was derived in previous processing of another image.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following exemplifying description of embodiments, fingerprints will be used to exemplify biometric objects. This is merely meant as illustrative and by no means limiting. Contrarily, the problems and solutions according to embodiments disclosed herein may be equally applicable in relation to other biometric objects such as, but not limited to, palm prints, iris patterns, facial features, etc.

According to some embodiments described herein, a multiple image matching approach is provided which is efficient (e.g. in terms of latency and/or power consumption). The approach may be said to consider a trade-off between a best possible biometric performance and a minimum latency according to some embodiments.

Figure 1:
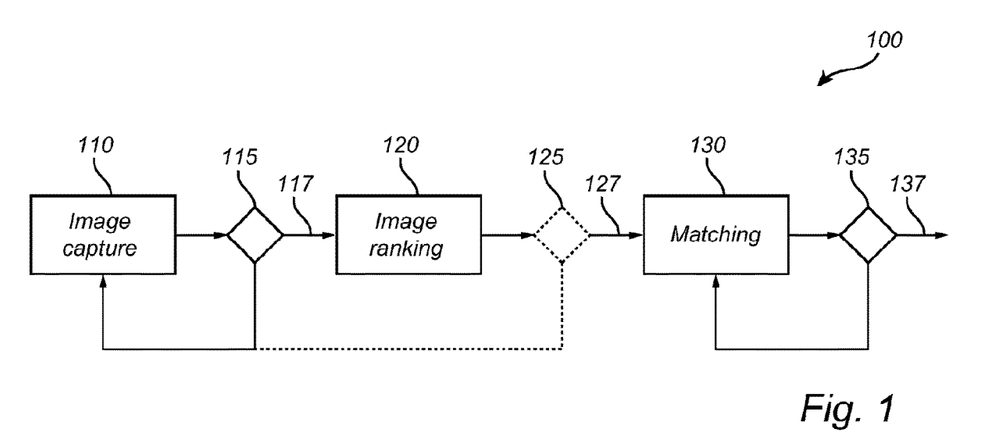
FIG. 1 is a schematic flowchart illustrating example method steps according to some embodiments.

FIG. 1 schematically illustrates an example method 100 according to some embodiments. The example method 100 starts with an image capturing step 110 where an image capturing device captures an image of a biometric object (e.g. a fingerprint). The image capturing step 110 is iterated to provide a plurality of captured images during a single activation of a biometric sensor (e.g. a fingerprint sensor) associated with the image capturing device as illustrated by decision step 115.

The decision step 115 comprises one or more condition tests that determine when the iteration of the capturing step is to be seized. The image capturing of step 110 may, for example, be iterated as long as the biometric sensor is activated (e.g. until it is determined that the biometric object, e.g. a finger, is removed from the biometric sensor, e.g. a fingerprint sensor) and/or until a maximum number of images have been captured. It should be understood that the decision step 115 may, additionally or alternatively, apply other suitable criteria according to some embodiments.

When the iteration of the image capturing step is seized, the plurality of captured images $c_i$, represented by 117, may be denoted $C=\{c_1 c_2 \ldots c_{N_C}\}$, where the index $i=\{1\ 2\ \ldots\ N_C\}$ is an index denoting the time order for the image captures and $N_C$ denotes the number of captured images during the single activation of the biometric sensor.

The method continues to image ranking step 120 where the plurality of captured images is ranked according to some suitable ranking metric. In some embodiments, the ranking may comprise sorting the images in order of descending ranking metrics. For example, the ranking may comprise assigning a highest rank to the image in the plurality of images that has a ranking metric representing a highest quality among the images in the plurality of images.

The ranking metric may be any suitable metric, e.g. a quality metric, exemplified by the following two examples wherein the metric is termed "quality metric" in the first example and "pixel intensity variation" in the second example.

In the first example of ranking metric, there is provided a method of determining a quality metric of an image captured by a fingerprint sensing device. The method comprises acquiring a fingerprint image, forming a first image quality metric based on a number of saturated pixels in relation to a total number of pixels in the image, forming a second image quality metric for the image and forming a total image quality metric by combining the first and second image quality metrics.

In the present context, saturation refers to when a pixel in an image is at or near its maximum or minimum value. As an example, for pixels having an 8-bit resolution, a saturated pixel has a value close to 0 or 255. Accordingly, a saturated pixel may also be referred to as a black or white pixel. One situation which may result in an image with a high degree of saturated pixels could be if the image is captured to soon after a finger has been detected by the fingerprint sensing device, i.e. when only a part of the finger is in contact with the fingerprint sensing surface, which in turn leads to an image having a high degree of white pixels.

In a fingerprint image having a high degree of saturated pixels it may be difficult to accurately detect the actual fingerprint pattern, thereby making it difficult to successfully perform matching with a stored fingerprint template. Moreover, if a quality metric is used which does not take a saturation into account, an image which is substantially uniform, such as a mostly white image, may be selected for matching, which in turn may lead to a high false rejection rate (FRR).

In view of this, an improved image quality metric can be determined by combining a first image quality metric based on saturation with a second image quality metric based on other image properties. Thereby, the FRR can be improved and images having a large number of saturated pixels are not mistakenly given a high quality value. Moreover, the second image quality metric may in turn comprise a plurality of different metrics, or the determined combined image quality metric may be combined with further quality metrics to form an overall quality metric of the image.

Furthermore, the described method may be used to improve an already existing image quality metric, and can as such be implemented to improve the matching performance.

The first and second image quality metrics may be combined using a weighting factor $\alpha$, wherein the total image quality metric is a weighted combination of the first and second image quality metrics. Thereby, the relative weight of the saturation based quality metric in relation to the other quality metric can easily be adjusted. The weighting factor $\alpha$ may have a value between 0 and 1, wherein the total image quality metric is determined as $\alpha$ times the second image quality metric plus $(1-\alpha)$ times the first image quality metric. The weighting factor $\alpha$ may be a predetermined weighting factor for a known fingerprint sensing device. Thereby, the first quality metric may easily be used and adapted for different sensor types where the influence of saturated pixels on the total image quality may have different weight.

The combining of the first and second image quality metrics may be adaptively adjusted. Accordingly, the way in which the first and second quality metrics are combined may change based on external input. For example, the properties of the fingerprint sensing device may change over the lifetime of the device, or the properties may change depending on external environmental properties, requiring the weighting of the different quality metrics to change to maintain a high matching accuracy. The combining of the first and second image quality metrics may be adjusted based on an image quality metric obtained from a previous input image. Moreover, the combination of the image quality metric may be based on multiple earlier images such that e.g. the distribution across a number of images could be taken into account. This could for example be the case for a temporal sequence of images acquired for a single touch, where the first image quality metric could have a high weight initially when little finger area is placed on the sensor and less weight when sufficient finger area is placed on the sensor. The adaptive adjustment of the combination of the image quality metrics may be achieved by adaptively adjusting the weighting factor $\alpha$.

The number of saturated pixels in an image may be determined by comparing an intensity value of each pixel of the image with an upper and lower threshold value, such that the pixel having an intensity above the upper threshold value or below the lower threshold value is considered to be saturated. As an example the threshold values may be 0 and 255, or they may be e.g. 2 and 253, based on an 8-bit representation of the intensity. Obviously, for other representations the thresholds will take on other values.

The first image quality metric may be set to zero if all pixels in an image are saturated. Correspondingly, if no pixels in an image are saturated, the first image quality metric may be set to a predetermined maximum image quality metric value. The predetermined value may be 1 or it may be arbitrarily selected to form a value suitable for combining with other quality metric values.

The second image quality metric may be normalized with respect to said first image quality metric, thereby simplifying the combination of the two image quality metrics. Furthermore, by normalizing the image quality metrics, the weighting may be determined only by the weighting factor and not by an independent weighting of the two image quality metrics.

The second quality metric may be based on a contrast, a spatial intensity variation and/or a frequency or orientation content of said image, which all may be used to provide an indication of an image quality.

In the second example of ranking metric, a processing unit is configured to determine an intensity for a plurality of pixels of a captured image of an object (e.g. a fingerprint), estimate local curvatures of pixel intensity variation in the captured image, and determine from the estimated local curvatures if local pixel intensity variation is dominated by a single direction, in which case the object on the fingerprint sensor is considered to constitute a finger.

Hence, the fingerprint sensor captures an image of an object contacting the sensor, and the processing unit determines from the captured image an intensity for a plurality of pixels of the captured image and estimates local curvatures of pixel intensity variation in the captured image.

Variation in pixel intensity of a captured image of a fingerprint is substantial when comparing the intensity of a pixel representing a ridge (where the pixel is black) with the intensity of a neighboring pixel representing a valley (where the pixel is white). The variation in pixel intensity is thus at its maximum when transitioning from a ridge to a valley, or from a valley to a ridge, whereas when comparing two pixels both representing a ridge (or both representing a valley), the difference in pixel intensity is very small.

Further, the processing unit determines from the estimated local curvatures whether local pixel intensity variation is dominated by a single direction, in which case the object on the sensor is considered to constitute a finger.

The captured image is dominated by pixels where the intensity variation around the pixel is low in the direction of the ridge or valley to which the pixel belongs, while the intensity variation is high in a direction perpendicular to the ridge-valley orientation.

For a captured image of for instance a piece of fabric or cloth, local variations in pixel intensity are relatively small, and pixel intensity variation does not indicate any particular direction. The local curvature of the pixel intensity is in such case said to be isotropical or circular, i.e. there is little or no evidence of a fingerprint ridge or valley around a pixel, a characteristic of many non-fingerprint images.

The estimating of the local curvatures of the pixel intensity may be performed by computing the so called Hessian matrix with second-order derivatives of the pixel intensities, calculated at each pixel. The components of the Hessian matrix may be computed by convolving the captured image with a first filter in an x-direction, convolving the captured image with a second filter in a y-direction, and convolving the captured image with a third filter in the x-direction and then convolving the result of the convolution with the third filter with a fourth filter in the y-direction. The square of the Hessian matrix may be computed and/or trace and determinant of the Hessian matrix may be computed to derive properties of its eigenvalues $\lambda 1$ and $\lambda 2$ in some examples.

A Fractional Anisotropy (FA) measure may be computed using eigenvalues of the computed Hessian matrix. From the Hessian matrix computed in each pixel, two eigenvalues $\lambda 1$ and $\lambda 2$ are derived and these two eigenvalues are used to compute the square of the so called FA measure in order to advantageously determine whether local pixel intensity variation is dominated by a single direction. A fingerprint qualification score (FQS) may be calculated as a linear combination of all the FA measure values for said plurality of pixels normalized by the number of said plurality of pixels. For convenience, the FQS can be scaled. The FQS may thus be computed as the scaled (e.g. by 100) average of the FA measure across all pixels in the captured image. The FQS may be compared to a threshold value, wherein the local pixel intensity variation is considered to be dominated by a single direction if the fingerprint qualification score exceeds the threshold value.

Returning to FIG. 1, the image ranking step 120 may be included in the iteration process of step 110 according to some embodiments. For example, each of the images is sorted into a ranked list as soon as it is captured wherein the ranked list comprises previously captured (and ranked) images associated with the single activation of the biometric sensor. In such embodiments, a decision step 125 similar to the decision step 115 is inserted after the image ranking step 120. Furthermore, the decision step 115 may or may not be removed in such embodiments.

When the image ranking is complete, the plurality of captured and ranked images $m_j$, represented by 127, may be denoted $M=\{m_1\ m_2\ \ldots\ m_{N_C}\}$, where the index $j=\{1\ 2\ \ldots\ N_C\}$ is an index denoting the ranking order for the images, and where the ranking process may be expressed as $C \rightarrow M$. In embodiments where the ranking is in terms of descending metrics, $m_1$ represents the captured image with the highest metric and $m_{N_C}$ represents the captured image with the lowest metric. Generally, the ranking aims at increasing the likelihood (or probability) of a successful match for the highest ranked image $m_1$.

The method continues to matching step 130 where matching attempts are made for the images in the order of the ranking. In typical embodiments, matching attempts are made for each image in the order of ranking until a match (or a stipulated number of matches) is found or until matching attempts have been made for all images of the plurality of images. Thus, decision step 135 may typically lead the method 100 back to step 130 if no match (or less than the stipulated number of matches) has yet been found and there are still captured images that have not been processed in step 130. It should be understood that the decision step 135 may, additionally or alternatively, apply other suitable criteria according to some embodiments.

In some embodiments, the decision step 135 may further comprise looping back to image capturing step 110 if no match is found for any of the plurality of images to capture more images if the biometric sensor is still activated. This option is not shown in FIG. 1.

When completed, the method outputs a match indicating signal (denoting a "pass" for the biometric object) if a match is found as represented by 137. In some embodiments, the method may additionally output—also represented by 137—a non-match indicating signal (denoting a "no pass"/"fail" for the biometric object) if no match is found for any of the plurality of images.

After the first matching attempt in step 130, a lot of information calculated in the process of the first matching attempt is available. As will be exemplified later herein, such information may be utilized in subsequent matching attempts to reduce the overall latency of the matching and/or to improve reliability of the matching.

Figure 2:
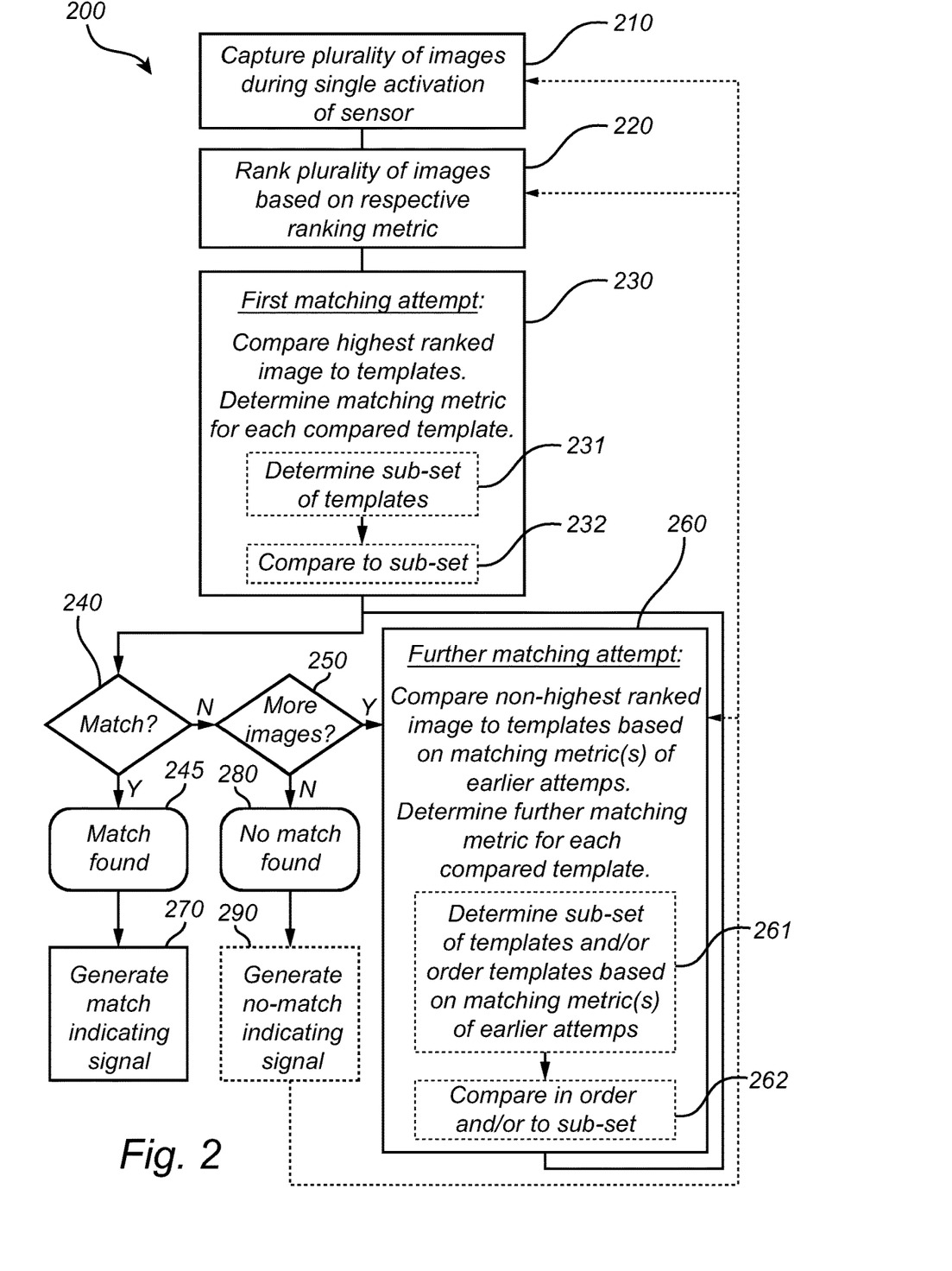
FIG. 2 is a flowchart illustrating example method steps according to some embodiments.

FIG. 2 illustrates an example method 200 according to some embodiments. The method 200 may be considered in combination with the method 100 of FIG. 1, and any features or examples described for one of the methods 100 and 200 may be equally applicable to the other one of the methods 100 and 200.

The example method 200 is for biometric object matching. As mentioned previously, a biometric object may, for example, be a fingerprint, a palm print, an iris pattern, a collection of facial features, etc.

The method 200 starts in step 210 (compare with step 110 of FIG. 1), where a plurality of images of a single biometric object are captured by an image capturing device during a single activation of a biometric sensor associated with the image capturing device. Since the images are of a single biometric object, all images of the plurality of images are of the same biometric object. Since the plurality of images is captured during a single activation of the biometric sensor, the capturing of the plurality of images may be performed uninterruptedly and/or automatically.

After the image capturing in step 210, the method 200 continues to step 220 (compare with step 120 of FIG. 1), where the images of the plurality of images are ranked based on respective ranking metrics to determine a highest ranked image and at least one non-highest ranked image. For example, the ranking may be such that a first image of the plurality of images, which has a first ranking metric value, has higher rank than a second image of the plurality of images, which has a second ranking metric value, if the first ranking metric value is indicative of a higher image quality than the second ranking metric value.

As mentioned in connection with FIG. 1 the capturing and ranking (steps 210 and 220) may be performed in parallel according to some embodiments.

After ranking in step 220, the method 200 continues to the matching part of the method (compare with step 130 of FIG. 1) by proceeding to step 230.

In step 230, a first matching attempt for the biometric object is performed by comparing the highest ranked image to templates of a plurality of pre-stored biometric object templates. The comparison in step 230 may be to all stored templates or to a sub-set of the stored templates. The latter alternative is illustrated by optional sub-steps 231 where a first matching attempt sub-set of the templates is determined and optional sub-step 232 where the highest ranked image is compared to templates of the first matching attempt sub-set only.

In a first example, the first matching attempt sub-set may comprise all pre-stored biometric object templates excluding templates which are used at a frequency that is lower than a template rare usage threshold (i.e. templates that are very rarely used). In a second example, the first matching attempt sub-set may comprise groups of pre-stored biometric object templates (each group comprising templates for e.g. the same finger or the same user) which are used at a frequency that is higher than a group frequent usage threshold (excluding rarely used groups of templates). These examples are generally applicable to embodiments referred to herein.

For each template compared with the highest ranked image, a matching metric is determined.

In step 240, it is determined whether at least one of the matching metrics exceeds a matching threshold value. When at least one of the matching metrics exceeds the matching threshold value (Y-path out from step 240) it is considered that a match is found as indicated by step 245 and a match indicating signal is generated in step 270. When no (or less than the specified number of) matching metrics exceed the matching threshold value (N-path out from step 240), the method continues to step 250.

In some embodiments, steps 230 and 240 may be executed in parallel, such that the determination of step 240 is performed after, for example, each comparison, and such that no further comparisons are made in step 230 when it is considered by step 240 that a match is found. In such embodiments, comparisons may be made until the highest ranked image is matched to a template (or to a specified number of templates) or until there are no more templates to compare with (either in the whole set of templates or in the sub-set of templates).

In step 250, it is determined whether there are more images in the plurality of images that have not yet been submitted to a matching attempt. If so (Y-step out from step 250), the method 200 proceeds to step 260.

In step 260 (compare with step 230), a further (e.g. second, third, fourth, etc.) matching attempt for the biometric object is performed by comparing the one of the non-highest ranked images to some or all templates of a plurality of pre-stored biometric object templates. Typically, the second highest ranked image is compared in the second matching attempt, the third highest ranked image is compared in the third matching attempt, and so on.

For each template compared with the non-highest ranked image in step 260, a further matching metric (compare with the matching metric of step 230) is determined.

The further matching attempts of step 260 are based on the matching metrics of the first matching attempt of step 230 and (optionally) on the further matching metrics of the further matching attempts of previous executions of step 260.

As for step 230, the comparison in step 260 may be to all stored templates or to a sub-set of the stored templates. The latter alternative is illustrated by optional sub-steps 261 where a further matching attempt sub-set of the templates is determined (based on previously determined matching metrics) and optional sub-step 262 where the image is compared to templates of the further matching attempt sub-set only. The selection of which templates to include in the sub-set may be made at template level or at a suitable template group level. For example, the sub-set may be determined to comprise templates (or groups) with highest previously determined matching metrics (e.g. higher than some threshold or a specified number of templates).

Additionally or alternatively, the comparison in step 260 may be performed in a particularly determined order to increase the probability (or likelihood) that a match is found quickly. This alternative is also illustrated by optional sub-steps 261 where an order of the templates is determined (based on previously determined matching metrics) and optional sub-step 262 where the image is compared to templates in the determined order. The ordering may be made at template level or at a suitable template group level. For example, the order may be determined as having templates (or groups) with highest previously determined matching metrics first and thereafter templates (or groups) in descending order of previously determined matching metrics.

Additionally or alternatively, the comparison in step 260 may be performed on multiple images in parallel.

To exemplify the template group levels in the context of fingerprints, each finger may be represented by several templates (together comprising a finger group) and/or each user may be represented by several fingers among the pre-stored templates (together comprising a user group). In this example, sub-set selection and/or ordering may thus be made on template basis (template level), on finger basis (template group level), or on user basis (template group level).

The interoperation between step 260 and step 240 is equivalent (or correspondingly similar) to the interoperation between step 230 and step 240 described above. The matching threshold value of step 240 may optionally be dynamically adapted based on previously determined matching metrics.

If it is eventually determined in step 250 that there are no more images in the plurality of images that have not yet been submitted to a matching attempt (N-step out from step 250), it is considered that no match is found as indicated by step 280. When the method has reached 280 a non-match indicating signal may be generated as illustrated by step 290. Alternatively or additionally, the method may return to step 210 to capture more images if the biometric sensor is still activated, and the method may be iterated by proceeding to step 220. Yet alternatively or additionally, the method may return to step 230 or to step 260 to extend the comparison to more of the pre-stored templates if comparison was previously made to a sub-set of the stored templates.

In some embodiments, the method illustrated in FIG. 2 may be used for granting template updating by the match indicating signal of step 270. In such embodiments, the sub-sets of steps 230 and 260 typically comprise the template(s) to be updated if already known.

Alternatively, the sub-sets of step 260 typically comprise the template(s) to be updated as determined by the result of step 230.

Further, matching of a first number (greater than one) of images may be required since the reliability requirements are typically more strict for template updating than for access granting (or similar). To that end, a counter may be implemented in step 240 to determine when matches have been found for at least the first number of images when processed in step 230 or 260.

Alternatively or additionally, an updating threshold value may be used in step 240 instead of matching threshold value. The updating threshold value may be the same or different than the matching threshold value. Typically, the updating threshold value is more strict (e.g. higher) than the matching threshold value.

Hence, in an updating attempt for a template of the plurality of pre-stored biometric object templates, the method may comprise comparing (in steps 230 and 260) a first number (greater than one) of the plurality of images to the template and determining (in step 240) whether at least a second number (greater than one and less than, or equal to, the first number) of the matching metrics exceed an updating threshold value. If so, updating of the template may be granted in relation to step 270 based on the plurality of images. If not, updating of the template may be prevented in relation to step 280.

Figure 3:
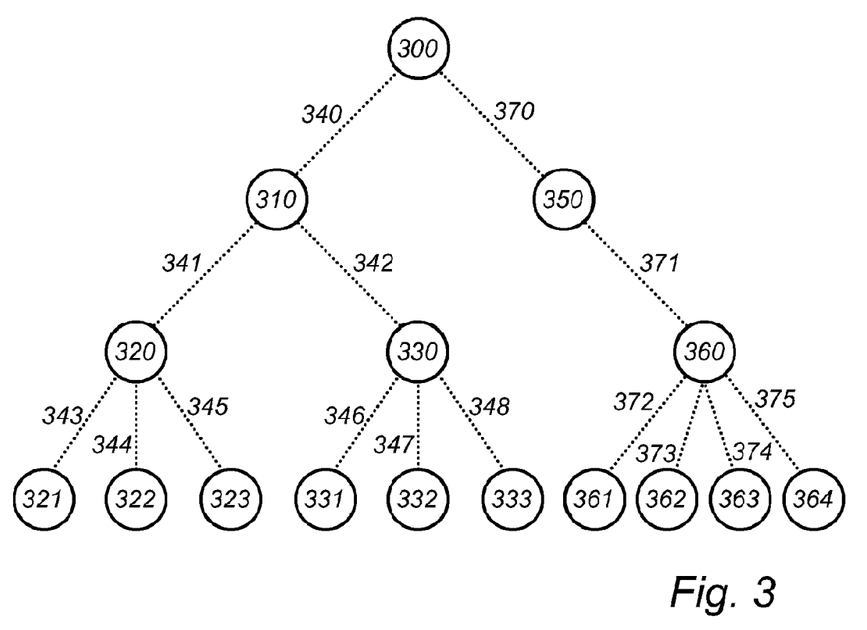
FIG. 3 is a tree diagram illustrating example biometric object templates according to some embodiments.

FIG. 3 is a tree diagram illustrating example biometric object templates according to some embodiments. In this example, the nodes 321, 322, 323, 331, 332, 333, 361, 362, 363, 364 each represent a fingerprint template, and the top node 300 may represent an attempt to match an image to any of the templates.

The templates of nodes 321, 322, 323 are associated with the same finger and may hence be grouped together in a finger group represented by node 320. Similarly, the templates of nodes 331, 332, 333 are also associated with the same finger and may be grouped together in a finger group represented by node 330. Also similarly, the templates of nodes 361, 362, 363, 364 are associated with the same finger and may be grouped together in a finger group represented by node 360.

The finger represented by node 320 and the finger represented by node 330 belong to the same user and may be grouped together in a user group represented by node 310, while the finger represented by node 360 belongs to another user and forms another user group represented by node 350.

In a tree diagram, each branch 340, 341, 342, 343, 344, 345, 346, 347, 348, 370, 371, 372, 373, 374, 375 may be associated with a probability as is well known in the art. Thus, the probability associated with branch 340 is the probability that the image corresponds to a biometric object of the user represented by node 310, and the probability associated with branch 341 is the probability that the image corresponds to the finger represented by node 310.

In the context of the example of FIG. 3, let $u_i$ denote enrolled user (310, 350) and let $f_{i,j}$ denote the $j^{th}$ enrolled finger of user i (320, 330, 360). In a scheme such as that of FIG. 3 where multiple templates (or sub-templates) are associated with each finger $f_{i,j}$, these are denoted $t_{i,j,k}$ (321, 322, 323, 331, 332, 333, 361, 362, 363, 364), where $k \in \{1, \ldots, N_t\}$ and $N_t$ is the maximum number of allowed templates.

The (further) matching metrics will now be exemplified with reference to the notation introduced above.

When performing the matching (compare with steps 230 and 260 of FIG. 2) using the image $m_n$ against (sub-)template $t_{i,j,k}$, this is referred to as $$s_{i,j,k}|m_n = \varrho(m_n; t_{i,j,k}),$$

where $\varrho(\cdot;\cdot)$ denotes the comparison process (e.g. matching in the spatial domain or feature space), and $s_{i,j,k}|m_n$ denotes the score that is returned from the comparison process when matching image $m_n$ against (sub-)template $t_{i,j,k}$. The score could be a number or a likelihood value of a potential match. This means that the higher the score $\varrho(m_n; t_{i,j,k})$, the more likely it is that image $m_n$ stems from user $u_i$, and finger $f_{i,j}$.

When matching the first image $m_1$ against all the enrolled templates (compare with step 230 of FIG. 2), this could result in a full tree search (exhaustive search) if no template yields a score which is sufficiently high in relation to the matching threshold. This implies that scores for all (sub-)templates are known for matching attempt $m_1$. Thus, it will be possible to transform the scores (or normalize the likelihood) into a cost that can be associated with the nodes in the tree. An example of a cost could e.g. be the relative search probabilities of matching with the next incoming image $m_n$ where $n>1$.

One way of calculating the relative search probabilities would be to normalize according to $$\tilde{P}(t_{i,j,k}|m_1) = \frac{s_{i,j,k}|m_1}{\Phi_1},$$

where $\Phi_1 \triangleq \Sigma_{i,j,k} s_{i,j,k}|m_1$, i.e. the sum of all scores for all templates, users, and fingers. Thus, a summation of all the scores $s_{i,j,k}|m_1$ is made to normalize each individual score (or likelihood).

This measure is obviously not the true probability that the next image will match any of the templates (even though $\Sigma_{i,j,k}\tilde{P}(\cdot)=1$, there is a probability that the image will not match any of the templates), which is why the notation $\tilde{P}(\cdot)$ is used. But the relative search probability above may still be useful as a priori information from the first matching attempt when performing the tree search for the following images.

Thus, either the scores or the relative search probabilities (costs) may be used as (further) matching metrics as suitable, including the following variations.

As mentioned before, the search order and/or a sub-set for search may be determined based on costs, e.g. the relative search probabilities $\tilde{P}(\cdot)$ (compare with sub-steps 261 and 262 of FIG. 2). This will enable a search scheme where the most likely (sub-)templates are examined first and/or only the most likely (sub-)templates are examined.

As also mentioned above, the ordering and/or sub-set selection may be made on template level as above or on a template group (e.g. finger or user) level.

For example, the relative search probabilities on (sub-)template level may be used to form relative search probabilities (or likelihood ratios) for fingers. This can be done by combining the contributions from the different templates of a finger:

$$\tilde{P}(f_{i,j}|m_1) = \Sigma_k \tilde{P}(t_{i,j,k}|m_1).$$

By knowing the relative search probability for each finger it is feasible to, for example, focus the second tree search (matching attempt) on some selected fingers rather than examining all fingers.

Similarly, relative search probabilities (or likelihood ratios) may be formed for users:

$$\tilde{P}(u_i|m_1) = \Sigma_j \tilde{P}(f_{i,j}=m_1) = \Sigma_{k,j}\tilde{P}(t_{i,j,k}|m_1).$$

This may, for example, enable a tree search that examines the fingerprint of a selected user first.

In some embodiments, the effect of non-uniform template sizes for different fingers is taken into account when computing relative search probabilities (likelihoods) for each finger. This can, for example, be done by normalizing $\tilde{P}(f_{i,j}|m_1)$ by the template size $K_{i,j}$ of finger $f_{i,j}$:

$$\check{P}(f_{i,j}|m_1) = \tilde{P}(f_{i,j}|m_1)/K_{i,j},$$

where $K_{i,j} \in \{1, \ldots, N_t\}$ and ensuring that the terms are normalized (e.g. by normalizing with $\psi \triangleq \Sigma_{i,j}\check{P}(f_{i,j}|m_1)$).

In a reduced tree search approach, any of the further searches (e.g. $m_2$) may be a reduced search (e.g. via tree pruning) where only the most likely templates, only the most likely fingers, only the most likely users, or combinations thereof are examined. Since costs (relative search probabilities) can be computed for the entire tree, a "greedy first" tree search approach could also be used, where only the most likely paths are examined. In some embodiments, only temples $t_{i,j,k}$ with high overlap with the best matching temples $t_{i,j,k}|m_1$, are considered in further matching attempts.

Combination of matching metrics across multiple matching attempts may be considered according to some embodiments as also mentioned above. For example, when $n>2$ images are processed in the any of the matching steps, the normalization can be based on both $\Phi_1$ and $\Phi_2$ (if an exhaustive search has also been made for $m_2$). A linear combination of $\Phi_1$ and $\Phi_2$ may be used when computing the joint normalization term, here denoted $\Phi_1 \cup \Phi_2$.

Similarity between matching images (e.g. $m_1$ and $m_2$) may also be taken into account when the relative probabilities are computed. If there is strong correlation between $m_1$ and $m_2$ it is more likely that accurate relative search probabilities $\tilde{P}(\cdot)$ can be derived, whereas a weak correlation should (relatively speaking) give a more uniform distribution of all $\tilde{P}(\cdot)$ when predicting the cost/relative searching probability of $m_2$.

In some embodiments, the similarity between matching images may be taken into account by adding a regularization coefficient, here denoted $\alpha \in [0; \infty]$, such that $$\tilde{P}(t_{i,j,k}|m_1) = \frac{\alpha + s_{i,j,k}|m_1}{\Phi_1(\alpha)}$$

$$\Phi_1(\alpha) \triangleq \sum_{i,j,k}(\alpha + s_{i,j,k}|m_1).$$

When there is high similarity a low $\alpha$ value may be chosen. When there is no correlation between $m_1$ and $m_2$, $\alpha \to \infty$ may be used which effectively means that $\tilde{P}(\cdot)$ converges to samples from a uniform distribution.

Template poisoning is when a non-genuine (imposter) template is added to the enrolled template. This increases the risk of false accepts in future matching attempts. Two different thresholds for comparison with the relative search probabilities (scores) may be used as elaborated on above. Such an approach may prevent template poisoning. One threshold, denoted $Thr_1$ (the matching threshold), may be used for granting access or similar (i.e. to give a "match"/"no match", or "pass"/"fail", verdict) and the other threshold, denoted $Thr_2$ (the update threshold), may be used for template updating, where the latter threshold is more strict than the first.

In a scenario where $m_1$ yields a match but the score does not exceed the threshold for template updating, i.e. $Thr_1 \leq \max(s_{i,j,k}|m_1) < Thr_2$, the process iteration of the matching step (compare with step 260 of FIG. 2) may be continued to determine if another one of the images yield a score that exceeds $Thr_2$. For example, this approach may be made efficient by utilizing $\tilde{P}(\cdot)$ and only match against a limited number of (sub-)templates. Furthermore, $\tilde{P}(\cdot)$ may be utilized to improve security by performing confirmation matches (checking if more images can be matched against the winning template(s)).

Figure 4:
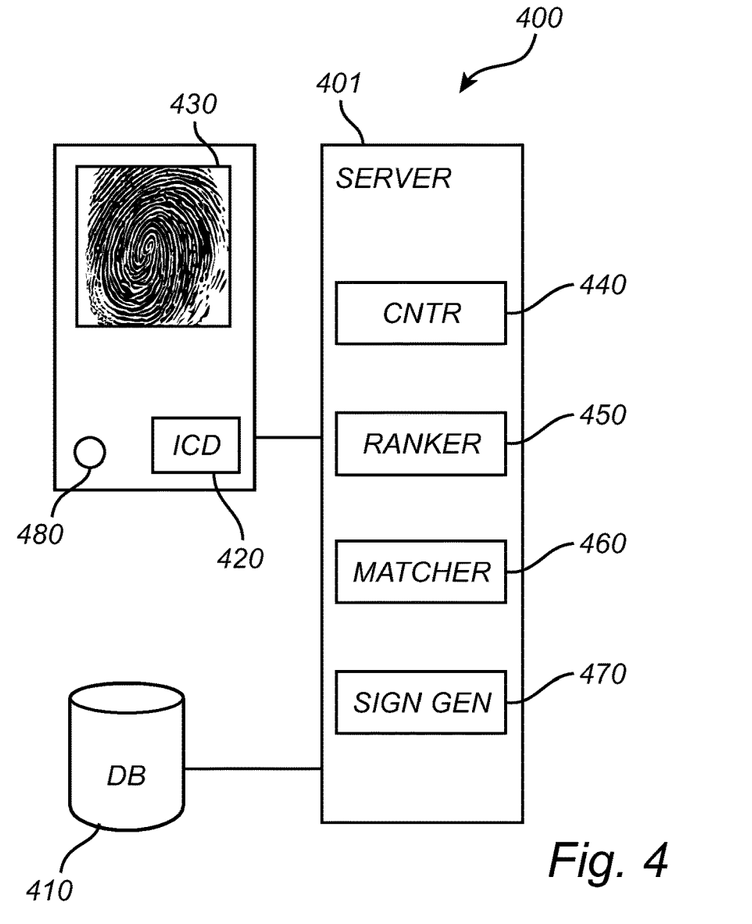
FIG. 4 is a schematic block diagram illustrating an example system according to some embodiments.

FIG. 4 schematically illustrates an example system 400 for biometric object matching according to some embodiments. The system comprises a server node (SERVER) 401, a memory (e.g. a data base, DB) 410 configured to pre-store a plurality of biometric object templates, a biometric sensor 430 and an image capturing device (ICD) 420.

The biometric sensor is associated with the image capturing device and the image capturing device is configured to capture a plurality of images of a single biometric object during a single activation of the biometric sensor.

The server node 401 comprises an arrangement comprising circuitry adapted to cause execution of method steps as described in connection with any of the FIGS. 1 and 2. The circuitry may, for example, comprise one or more of a controller (CNTR) 440, a ranking module (RANKER) 450, a matching module (MATCHER) 460 (possibly comprising a comparing module and a match determination module) and a signal generation module (SIGN GEN) 470.

The circuitry is collectively configured to:
rank the plurality of images based on a ranking metric value of each of the plurality of images to determine a highest ranked image and at least one non-highest ranked image,
compare, in a first matching attempt for the biometric object, the highest ranked image to templates of the plurality of templates, including determination of a matching metric for each compared template,
determine whether at least one of the matching metrics exceeds a matching threshold value,
generate a match indicating signal when at least one of the matching metrics exceeds the matching threshold value, and
when none of the matching metrics exceed the matching threshold value, compare, in a further matching attempt for the biometric object, one of the non-highest ranked images to templates of the plurality of templates based on the matching metrics, wherein a further matching metric is determined for each compared template.

The system also comprises an interface 480 for receiving the match indicating signal. The interface may, for example, be a user interface (e.g. a display, a light emitting diode (LED), an audio interface, etc.) and/or a functional interface for enabling a particular action (e.g. unlocking a door, granting access to a computer system, allowing updating of a template, etc.). The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a server node.

Embodiments may appear within an electronic apparatus (such as a server node) comprising arrangements, circuitry, and/or logic according to any of the embodiments described herein. Alternatively or additionally, an electronic apparatus (such as a server node) may be configured to perform methods according to any of the embodiments described herein.

Figure 5:
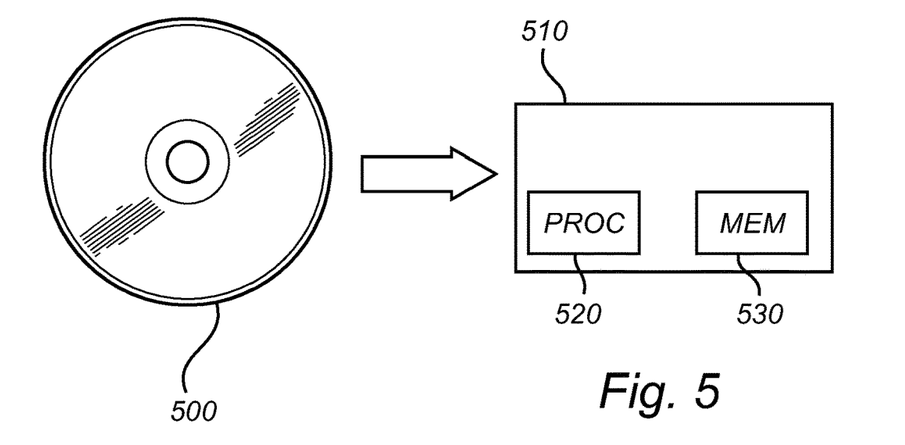
FIG. 5 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 5 illustrates an example computer readable medium in the form of a compact disc (CD) ROM 500. The computer readable medium has stored thereon a computer program comprising program instructions. The computer program is loadable into a data processor (PROC) 520, which may, for example, be comprised in a server node 510. When loaded into the data processing unit, the computer program may be stored in a memory (MEM) 530 associated with or comprised in the data-processing unit. According to some embodiments, the computer program may, when loaded into and run by the data processing unit, cause execution of method steps according to, for example, the method illustrated in FIG. 2.

Reference has been made herein to various embodiments. However, a person skilled in the art would recognize numerous variations to the described embodiments that would still fall within the scope of the claims. For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Hence, it should be understood that the details of the described embodiments are merely examples brought forward for illustrative purposes, and that all variations that fall within the scope of the claims are intended to be embraced therein.

The invention claimed is:
1. A biometric object matching method comprising:
capturing, by an image capturing device, a plurality of images of a single biometric object during a single activation of a biometric sensor associated with the image capturing device, each image comprising a plurality of pixels;
determining a ranking metric value of each image of the plurality of images based on analysis of each individual pixel in at least a subset of the plurality of pixels in each image;
ranking the plurality of images based on the ranking metric value of each image of the plurality of images to determine a highest ranked image and at least one non-highest ranked image;

comparing, in a first matching attempt for the biometric object, the highest ranked image to templates of a plurality of pre-stored biometric object templates, wherein a matching metric is determined for each compared template;

determining whether at least one of the matching metrics exceeds a matching threshold value;

generating a match indicating signal when at least one of the matching metrics exceeds the matching threshold value;

when none of the matching metrics exceed the matching threshold value, comparing, in a further matching attempt for the biometric object, one of the non-highest ranked images to templates of the plurality of templates based on the matching metrics, wherein a further matching metric is determined for each compared template;

determining whether at least one of the further matching metrics exceeds the matching threshold value;

generating the match indicating signal when at least one of the further matching metrics exceeds the matching threshold value; and when none of the further matching metrics exceed the matching threshold value, comparing, in a yet further matching attempt for the biometric object, another one of the non-highest ranked images to templates of the plurality of templates based on the matching metrics, wherein a yet further matching metric is determined for each compared template.

2. The method of claim 1 wherein the comparison of the yet further matching attempt is further based on the further matching metrics of the further attempt.

3. The method of claim 1, wherein the further matching attempt comprises:

determining a further matching attempt sub-set of the templates based on the matching metrics; and comparing the non-highest ranked image to templates of the further matching attempt sub-set only.

4. The method of any of claim 1, wherein the further matching attempt comprises:

determining an order of the templates based on the matching metrics; and comparing the non-highest ranked image to the templates in the determined order.

5. The method of any of claim 1, wherein the first matching attempt comprises:

determining a first matching attempt sub-set of the templates; and comparing the highest ranked image to templates of the first matching attempt sub-set only.

6. The method of claim 1, further comprising dynamically adapting the matching threshold value for the further matching attempt based on the matching metric.

7. The method of any of claim 1, further comprising:

comparing, in an updating attempt for a template of the plurality of pre-stored biometric object templates, a first number—greater than one—of the plurality of images to the template, wherein a matching metric is determined for each of the compared images;

determining whether at least a second number—greater than one and less than, or equal to, the first number—of the matching metrics exceed an updating threshold value;

updating the template based on the plurality of images when at least the second number of the matching metrics exceed the updating threshold value; and preventing update of the template when less than the second number of the matching metrics exceed the updating threshold value.

8. A computer program product comprising a non-transitory computer readable medium, having thereon a computer program comprising program instructions, the computer program being loadable into a data processing unit and configured to cause execution of the method according to claim 1, when the computer program is run by the data processing unit.

9. A biometric object matching arrangement comprising a controller configured to cause:

capturing, by an image capturing device, of a plurality of images of a single biometric object during a single activation of a biometric sensor associated with the image capturing device, each image comprising a plurality of pixels;

determination of a ranking metric value of each image of the plurality of images based on analysis of each individual pixel in at least a subset of the plurality of pixels in each image;

ranking of the plurality of images based on the ranking metric value of each image of the plurality of images to determine a highest ranked image and at least one non-highest ranked image;

comparison, in a first matching attempt for the biometric object, of the highest ranked image to templates of a plurality of pre-stored biometric object templates, including determination of a matching metric for each compared template;

determination of whether at least one of the matching metrics exceeds a matching threshold value;

generation of a match indicating signal when at least one of the matching metrics exceeds the matching threshold value;

when none of the matching metrics exceed the matching threshold value, comparison, in a further matching attempt for the biometric object, of one or more of the non-highest ranked images to templates of the plurality of templates based on the matching metrics, including determination of a further matching metric for each compared template;

determination of whether at least one of the further matching metrics exceeds the matching threshold value;

generation of the match indicating signal when at least one of the further matching metrics exceeds the matching threshold value; and when none of the further matching metrics exceed the matching threshold value, comparison, in a yet further matching attempt for the biometric object, of another one of the non-highest ranked images to templates of the plurality of templates based on the matching metrics, wherein a yet further matching metric is determined for each compared template.

10. The arrangement of claim 9 wherein the controller is configured to cause the further matching attempt by causing:

determination of a further matching attempt sub-set of the templates based on the matching metrics; and comparison of the non-highest ranked image to templates of the further matching attempt sub-set only.

11. The arrangement of claim 9, wherein the controller is configured to cause the further matching attempt by causing:

determination of an order of the templates based on the matching metrics; and comparison of the non-highest ranked image to the templates in the determined order.

12. The arrangement of claim 9, wherein the controller is configured to cause the first matching attempt by causing:
   determination of a first matching attempt sub-set of the templates; and
   comparison of the highest ranked image to templates of the first matching attempt sub-set only.

13. The arrangement of claim 9, wherein the controller is further configured to cause dynamic adaption of the matching threshold value for the further matching attempt based on the matching metric.

14. The arrangement of claim 9, wherein the controller is further configured to cause:
   comparison, in an updating attempt for a template of the plurality of pre-stored biometric object templates, of a first number—greater than one—of the plurality of images to the template, including determination of a matching metric for each of the compared images;
   determination of whether at least a second number—greater than one and less than, or equal to, the first number—of the matching metrics exceed an updating threshold value;
   update of the template based on the plurality of images when at least the second number of the matching metrics exceed the updating threshold value; and
   prevention of update of the template when less than the second number of the matching metrics exceed the updating threshold value.

15. A system for biometric object matching comprising:
   a biometric sensor associated with an image capturing device, the image capturing device configured to capture a plurality of images of a single biometric object during a single activation of the biometric sensor, each image comprising a plurality of pixels;
   a memory configured to pre-store a plurality of biometric object templates;
   circuitry configured to:
      determine a ranking metric value of each image of the plurality of images based on analysis of each individual pixel in at least a subset of the plurality of pixels in each image;
      rank the plurality of images based on the ranking metric value of each of the plurality of images to determine a highest ranked image and at least one non-highest ranked image;
      compare, in a first matching attempt for the biometric object, the highest ranked image to templates of the plurality of templates, including determination of a matching metric for each compared template;
      determine whether at least one of the matching metrics exceeds a matching threshold value;
      generate a match indicating signal when at least one of the matching metrics exceeds the matching threshold value; and
      when none of the matching metrics exceed the matching threshold value, compare, in a further matching attempt for the biometric object, one of the non-highest ranked images to templates of the plurality of templates based on the matching metrics, wherein a further matching metric is determined for each compared template,
      determine whether at least one of the further matching metrics exceeds the matching threshold value;
      generate the match indicating signal when at least one of the further matching metrics exceeds the matching threshold value; and
      when none of the further matching metrics exceed the matching threshold value, comparing, in a yet further matching attempt for the biometric object, another one of the non-highest ranked images to templates of the plurality of templates based on the matching metrics, wherein a yet further matching metric is determined for each compared template; and
   an interface for receiving the match indicating signal.

* * * * *